No. 791,709. PATENTED JUNE 6, 1905.
R. M. MEILI.
EDUCATIONAL APPARATUS.
APPLICATION FILED AUG. 24, 1904.

2 SHEETS—SHEET 1.

Witnesses

Inventor
R. M. Meili
Attorneys

No. 791,709. PATENTED JUNE 6, 1905.
R. M. MEILI.
EDUCATIONAL APPARATUS.
APPLICATION FILED AUG. 24, 1904.

2 SHEETS—SHEET 2.

Witnesses

Inventor
R. M. Meili

Attorneys

No. 791,709. Patented June 6, 1905.

UNITED STATES PATENT OFFICE.

RUDOLF M. MEILI, OF LUCCA, NORTH DAKOTA.

EDUCATIONAL APPARATUS.

SPECIFICATION forming part of Letters Patent No. 791,709, dated June 6, 1905.

Application filed August 24, 1904. Serial No. 221,970.

*To all whom it may concern:*

Be it known that I, RUDOLF M. MEILI, a citizen of the United States, residing at Lucca, in the county of Barnes, State of North Dakota, have invented certain new and useful Improvements in Educational Apparatus; and I do hereby declare the following to be a full, clear, and exact description of the invention, such as will enable others skilled in the art to which it appertains to make and use the same.

This invention relates to devices for teaching astronomy, and has for its object to provide a cheap and simple article with which the rudiments may be explained.

The invention will be fully understood from the description hereinafter given, taken in connection with the annexed drawings, forming a part of this specification, the same symbols of reference designating the same parts or features, as the case may be, wherever they occur.

Figure 1:
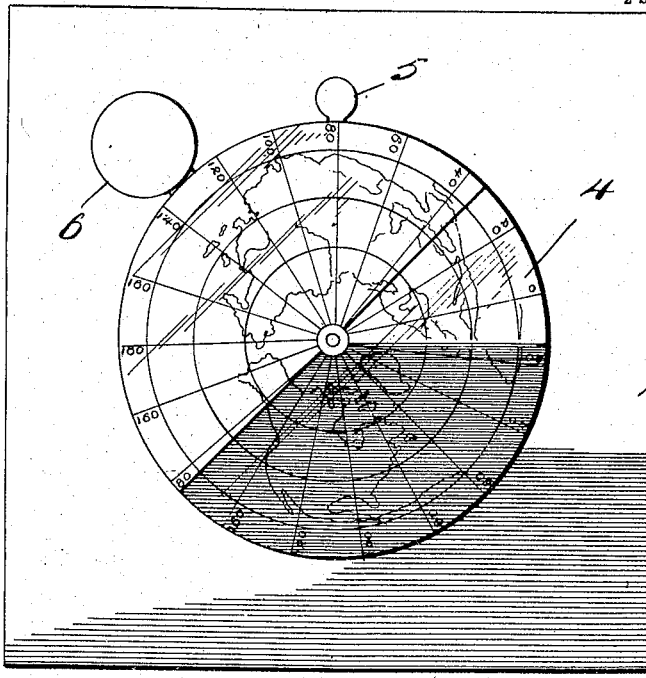
Figure 2:
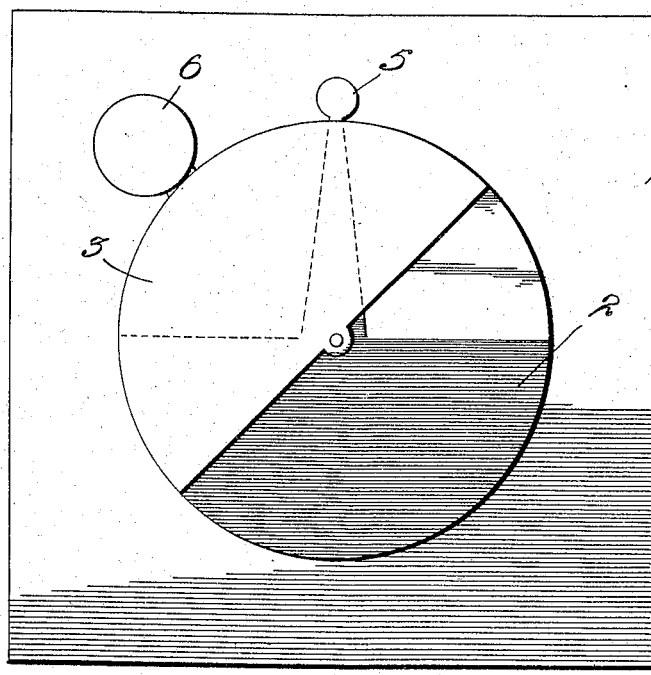
Figure 3:
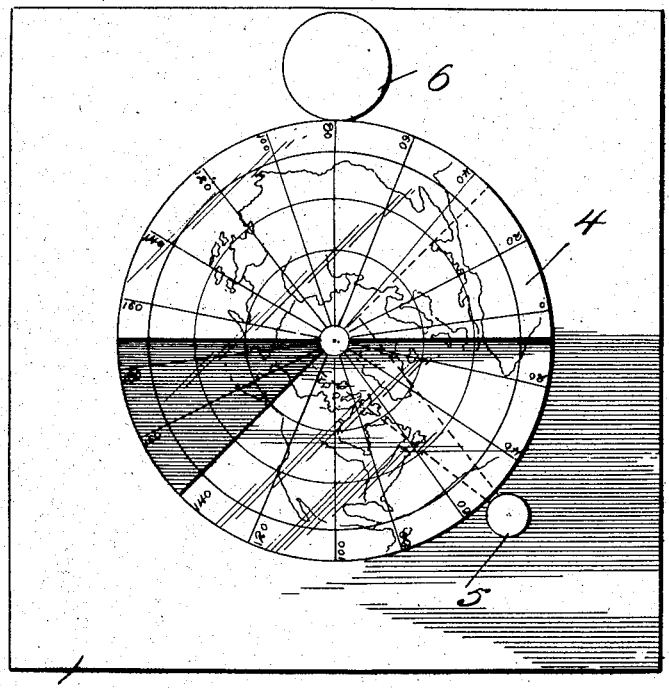

Of the drawings, Figure 1 is a face view of the device complete. Fig. 2 is a similar view with the front disk consisting of an astronomical chart removed. Fig. 3 is a view similar to Fig. 1, but with the parts in different positions.

Referring now to the drawings, the present device comprises, first, a ground or base card 1; second, a half-disk of colored or shaded card 2; third, a half-disk of white card 3, and, fourth, a disk of transparent or translucent material 4, having a chart of a hemisphere of the earth with one of the geographical poles forming the center. The half-disks 2 and 3 and the disk 4 are pivoted at their centers upon the base-disk 1, and the half-disks 2 and 3 are provided with round extension-pieces 5 and 6, respectively, extending beyond the circle of each, the former extension-piece representing the moon and the latter the sun.

In the use of the present device the parts representing the sun and moon are shifted pivotally and half-disks are correspondingly moved to indicate the portions of the earth from which the sun and moon, respectively, are visible.

What is claimed is—

1. A device for teaching the rudimental principles of astronomy as they are related to the sun, moon and earth, consisting of a base-card, a colored half-disk representing the shadows of the moon, a white half-disk representing one-half of the sun's light on the earth, and a translucent or transparent disk composing a hemisphere of the globe, said disk and half-disks being pivoted on the base-card.

2. A device for teaching the rudimental principles of astronomy as they are related to the sun, moon and earth, consisting of a base-card, a colored half-disk representing the shadows of the moon, a white half-disk representing one-half of the sun's light on the earth, and a translucent or transparent disk composing a hemisphere of the globe, said disk and half-disks being pivoted on the base-card, combined with two extension-pieces extending beyond the circle each connected with the half-disks and indicating the moon and sun, respectively.

In testimony whereof I affix my signature in presence of two witnesses.

RUDOLF M. MEILI.

Witnesses:
H. E. BLAIR,
H. V. FOX.